(12) United States Patent
Conyers et al.

(10) Patent No.: US 7,787,854 B2
(45) Date of Patent: Aug. 31, 2010

(54) SCALABLE DISTRIBUTED RADIO NETWORK

(75) Inventors: David J. Conyers, Minneapolis, MN (US); Michael J. Hermel, Waseca, MN (US); Larry G. Fischer, Waseca, MN (US); Jeff Solum, Deephaven, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 724 days.

(21) Appl. No.: 11/047,808

(22) Filed: Feb. 1, 2005

(65) Prior Publication Data

US 2006/0172775 A1 Aug. 3, 2006

(51) Int. Cl.
*H04B 1/38* (2006.01)
*H04M 1/00* (2006.01)

(52) U.S. Cl. .................. 455/403; 455/560; 455/561

(58) Field of Classification Search .............. 455/553.1, 455/560, 561, 562.1, 101, 428, 455
See application file for complete search history.

(56) References Cited

U.S. PATENT DOCUMENTS

| | | | |
|---|---|---|---|
| 4,183,054 A | 1/1980 | Patisaul et al. | |
| 4,451,916 A | 5/1984 | Casper et al. | |
| 4,611,323 A | 9/1986 | Hessenmüller | |
| 4,628,501 A | 12/1986 | Loscoe | |
| 4,654,843 A | 3/1987 | Roza et al. | |
| 4,691,292 A | 9/1987 | Rothweiler | |
| 4,999,831 A | 3/1991 | Grace | |
| 5,193,109 A | 3/1993 | Chien-Yeh Lee | |
| 5,243,598 A | 9/1993 | Lee | |
| 5,303,287 A | 4/1994 | Laborde | |
| 5,321,736 A | 6/1994 | Beasley | |
| 5,321,849 A | 6/1994 | Lemson | |
| 5,339,184 A | 8/1994 | Tang | |
| 5,381,459 A | 1/1995 | Lappington | |
| 5,400,391 A | 3/1995 | Emura et al. | |
| 5,461,627 A | 10/1995 | Rypinski | |
| 5,519,691 A | 5/1996 | Darcie et al. | |
| 5,545,397 A | 8/1996 | Spielvogel et al. | |
| 5,566,168 A | 10/1996 | Dent | |

(Continued)

FOREIGN PATENT DOCUMENTS

EP 0368673 5/1990

(Continued)

OTHER PUBLICATIONS

"Tektronix Synchronous Optical Network (SONET)", "http://www.iec.org/online/tutorials/sonet/topic03.html", 2002, Publisher: International Engineering Consortium.

(Continued)

*Primary Examiner*—Simon D Nguyen
(74) *Attorney, Agent, or Firm*—Fogg & Powers LLC

(57) ABSTRACT

A scalable network is provided. The network includes a remote device coupled to an antenna and adapted to communicate with subscriber units over an RF link, a switching device coupled to the remote device, and a radio suite coupled to the switching device. The radio suite includes two or more radios, each radio performs the functions of a base station transceiver. The switching device interconnects the radio suite with the remote device. Each radio supports one or more air interface standards.

30 Claims, 10 Drawing Sheets

U.S. PATENT DOCUMENTS

| | | | |
|---|---|---|---|
| 5,621,786 | A | 4/1997 | Fischer et al. |
| 5,627,879 | A | 5/1997 | Russell et al. |
| 5,642,405 | A | 6/1997 | Fischer et al. |
| 5,644,622 | A | 7/1997 | Russell et al. |
| 5,657,374 | A | 8/1997 | Russell et al. |
| 5,682,256 | A | 10/1997 | Motley et al. |
| 5,732,076 | A | 3/1998 | Ketseoglou et al. |
| 5,761,619 | A | 6/1998 | Danne et al. |
| 5,781,541 | A | 7/1998 | Schneider |
| 5,781,859 | A | 7/1998 | Beasley |
| 5,802,173 | A | 9/1998 | Hamilton-Piercy et al. |
| 5,805,983 | A | 9/1998 | Naidu et al. |
| 5,809,395 | A | 9/1998 | Hamilton-Piercy et al. |
| 5,822,324 | A | 10/1998 | Kostresti et al. |
| 5,852,651 | A | 12/1998 | Fischer et al. |
| 5,907,544 | A | 5/1999 | Rypinski |
| 5,987,014 | A | 11/1999 | Magill et al. |
| 6,034,950 | A | 3/2000 | Sauer et al. |
| 6,108,113 | A | 8/2000 | Fee |
| 6,108,550 | A | 8/2000 | Wiorek et al. |
| 6,108,626 | A | 8/2000 | Cellario et al. |
| 6,157,659 | A | 12/2000 | Bird |
| 6,188,693 | B1 | 2/2001 | Murakami |
| 6,222,660 | B1 | 4/2001 | Traa |
| 6,226,274 | B1 | 5/2001 | Reese et al. |
| 6,373,887 | B1 | 4/2002 | Aiyagari et al. |
| 6,377,640 | B2 | 4/2002 | Trans |
| 6,477,154 | B1 | 11/2002 | Cheong et al. |
| 6,498,936 | B1 | 12/2002 | Raith |
| 6,567,473 | B1 | 5/2003 | Tzannes |
| 6,667,973 | B1 | 12/2003 | Gorshe et al. |
| 6,674,966 | B1 * | 1/2004 | Koonen ............... 398/70 |
| 6,704,545 | B1 * | 3/2004 | Wala ................. 455/16 |
| 6,705,545 | B1 | 3/2004 | Sroka et al. |
| 6,729,929 | B1 | 5/2004 | Sayers et al. |
| 6,768,745 | B1 | 7/2004 | Gorshe et al. |
| 6,785,558 | B1 * | 8/2004 | Stratford et al. ........ 455/561 |
| 6,826,163 | B2 | 11/2004 | Mani et al. |
| 6,826,164 | B2 | 11/2004 | Mani et al. |
| 6,831,901 | B2 | 12/2004 | Millar |
| 6,865,390 | B2 * | 3/2005 | Goss et al. ............ 455/445 |
| 6,917,614 | B1 | 7/2005 | Laubach et al. |
| 7,127,175 | B2 | 10/2006 | Mani et al. |
| 7,205,864 | B2 | 4/2007 | Schultz, Jr. et al. |
| 7,215,651 | B2 | 5/2007 | Millar |
| 7,289,972 | B2 * | 10/2007 | Rieser et al. ........... 706/13 |
| 7,313,415 | B2 | 12/2007 | Wake et al. |
| 2002/0072329 | A1 | 6/2002 | Bandeira et al. |
| 2002/0077151 | A1 | 6/2002 | Matthews et al. |
| 2002/0167954 | A1 | 11/2002 | Highsmith et al. |
| 2002/0191565 | A1 | 12/2002 | Mani et al. |
| 2003/0015943 | A1 | 1/2003 | Kim et al. |
| 2003/0043928 | A1 | 3/2003 | Ling et al. |
| 2004/0010609 | A1 | 1/2004 | Vilander et al. |
| 2004/0037565 | A1 | 2/2004 | Young et al. |
| 2004/0198453 | A1 | 10/2004 | Cutrer et al. |
| 2004/0219950 | A1 * | 11/2004 | Pallonen et al. ......... 455/562.1 |
| 2005/0007993 | A1 | 1/2005 | Chambers et al. |
| 2005/0147067 | A1 | 7/2005 | Mani et al. |
| 2005/0201323 | A1 | 9/2005 | Mani et al. |
| 2005/0250503 | A1 | 11/2005 | Cutrer |
| 2006/0121944 | A1 * | 6/2006 | Buscaglia et al. ........ 455/561 |
| 2006/0193295 | A1 * | 8/2006 | White et al. ........... 370/336 |

FOREIGN PATENT DOCUMENTS

| | | |
|---|---|---|
| EP | 0391597 | 10/1990 |
| EP | 0876073 | 11/1998 |
| GB | 2253770 | 9/1992 |
| GB | 2289198 | 11/1995 |
| GB | 2315959 | 2/1998 |
| GB | 2320653 | 6/1998 |
| GB | 2386037 | 9/2003 |
| WO | 9115927 | 10/1991 |
| WO | 9533350 | 12/1995 |
| WO | 9628946 | 9/1996 |
| WO | 9716000 | 5/1997 |
| WO | 9732442 | 9/1997 |
| WO | 9824256 | 6/1998 |
| WO | 9937035 | 7/1999 |
| WO | 0174013 | 10/2001 |
| WO | 0174100 | 10/2001 |
| WO | 03079645 | 9/2003 |

OTHER PUBLICATIONS

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

Harvey et al., "Cordless Communications Utilising Radio Over Fibre Techniques for the Local Loop", "IEEE International Conference on Communications", Jun. 1991, pp. 1171-1175, Publisher: IEEE.

European Patent Office, "European Search Report", Feb. 18, 2010, Published in: EP.

* cited by examiner

SCALABLE DISTRIBUTED RADIO NETWORK

TECHNICAL FIELD

The present invention relates generally to the field of telecommunications, and, in particular, to scalable distributed software radio architecture for wireless telecommunication networks.

BACKGROUND

Wireless telecommunications systems transmit signals between users using radio frequency (RF) signals. A typical wireless communication system includes a plurality of base stations connected to the public switched telephone network (PSTN) or other communication network. Each base station includes a number of radio transceivers that are typically associated with a transmission tower. Each base station is located so as to cover a geographic region known colloquially as a "cell." Each base station communicates with subscriber units, e.g. cellular telephones, pagers, personal digital assistant, wireless modems, and other wireless terminals, located in its geographic region or cell. A base station includes a number of modules that work together to process voice and data signals. These modules typically include, by way of example, mixers, amplifiers, filters, transmission lines, antennas and other appropriate circuits. Many changes are taking place in the way wireless communication networks are being deployed. Some changes are being driven by the need to increase capacity in an environment with rapidly changing services and standards Upgrades to next generation wireless services require network operators to overlay new network architecture over their existing networks.

Furthermore, current radio equipment does not support multiple air interface standards and this limits others from roaming in your network.

For the reasons stated above, and for other reasons stated below which will become apparent to those skilled in the art upon reading and understanding the present specification, there is a need in the art for improvements in wireless networks to handle increased traffic.

SUMMARY

A scalable network is provided. The network includes a remote device coupled to an antenna and adapted to communicate with subscriber units over an RF link, a switching device coupled to the remote device and a radio suite coupled to the switching device. The radio suite includes two or more radios. Each radio performs the functions of a base station transceiver. The switching device interconnects the radio suite with the remote device. Each radio supports one or more air interface standards.

A cellular network is provided. The network includes a remote device coupled to an antenna and adapted to communicate with subscriber units over an RF link and a radio suite coupled to the remote device. The radio suite includes a radio that performs the functions of a base station transceiver. The radio supports one or more air interface standards.

A method of communicating in a cellular network is provided. The method includes receiving one or more radio frequency (RF) signals over an air interface, converting the one or more radio frequency signals to a digital optical representation of the RF signals, and transmitting the digital optical representation of the RF signals over an optical medium. The method further includes dividing the digital optical representation of the RF signals into a plurality of digital optical signals, converting each of the divided digital optical signals into digital RF signals at one of a plurality of electrical-to-optical modules, decimating the digital RF signals, and at each electrical-to-optical modules, passing only channels assigned to an associated software radio. Each software radio supports one or more air interface standards. The method further includes performing signal processing and transmitting the processed signals to one or more communication networks.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Typically, radio equipment in wireless networks is dedicated to the antennas and on a system level a fixed number of radios are "hardwired" to the antennae. The result is a limited number of channels deployed for each antenna. Embodiments of the present invention provide methods and systems for dynamically assigning radios (cards) to antennas. In one embodiment, radios are reassigned based on usage (need). For example in rush hour the cards are dynamically reassigned to additional antennas. In one embodiment, a switching device enables radios to be reassigned to the antennas.

Embodiments of the present invention provide for digitization of RF prior to transport. Digital RF transport is defined as transporting digital representations of RF signals. Transporting a digital representation of RF signals combines the flexible transparency of radio over fiber with the robust characteristics of digital links. As long as ones and zeroes can be detected, there is no interaction between optical and RF performance, simplifying installation and maintenance, and guaranteeing stable performance. While digital transport requires a relatively high data rate transport, the digital nature of the signal allows for a wide range of transport options, including dark fiber or wavelengths on a CWDM or DWDM network (including add/drop configurations), as well as free space optics and millimeter wave solutions.

It is understood that although fiber optics is discussed in this application as a means for transport it is not meant to be limiting in nature. U.S. application Ser. No. 09/619,431, assigned to ADC Telecommunications, Inc. and incorporated herein by reference, discusses digital RF signals.

Figure 1:
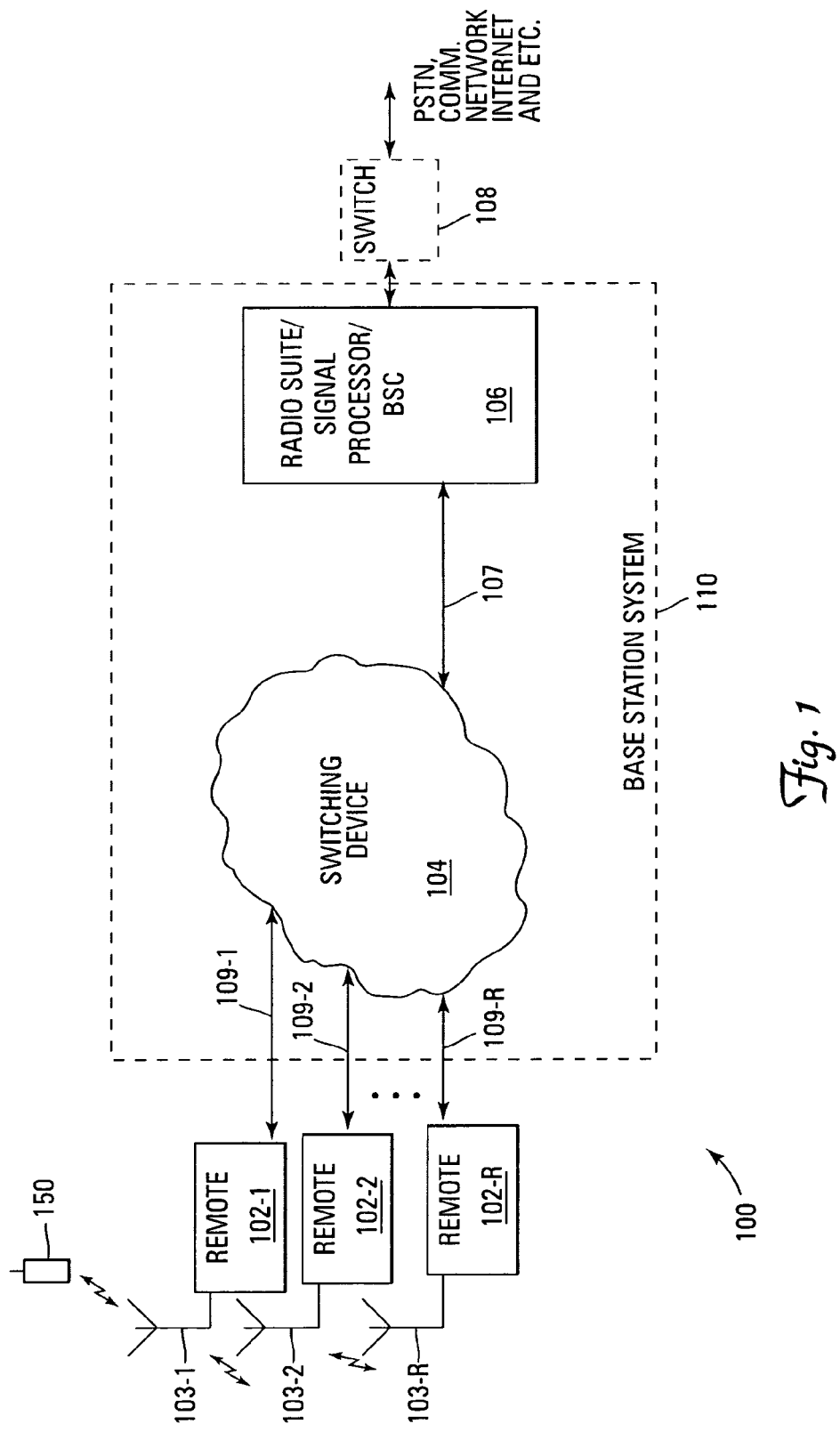
FIG. 1 is a block diagram of one embodiment of a scalable network.

FIG. 1 is a block diagram of one embodiment of a scalable network, shown generally at 100, according to the teachings of the present invention. In one embodiment, scalable network 100 dynamically allocates radios to antennas in a cellular network. Network 100 includes a base station system 110 coupled to one or more remote devices 102-1 to 102-R. Each remote device 102-1 to 102-R is coupled to an associated antenna 103-1 to 103-R, respectively. In one embodiment, base station system 110 includes a switching/cross connect device 104 coupled to a radio suite 106. Radio suite 106 is further coupled to a switch 108 that provides voice and/or data signals to one or more communication networks e.g. the public switched telephone network (PSTN), Internet, cable network, or the like. In one embodiment, switch 108 is a mobile switching center and handles the switching of calls with multiple base stations, a serving GPRS support node, or the like.

In operation when a subscriber unit 150 emits a transmission signal an antenna 103, within the designated coverage, area picks up the signal. Subscriber unit as used in this application includes but is not limited to cellular telephones, pagers, personal digital assistant, wireless modems, and other wireless terminals. An associated remote device 102 transmits the received signals to base station system 110 for routing to one or more communication networks. In one embodiment, switching device 104 receives the signal and connects the signal to one or more radios of radio suite 106. Radio suite 106 receives the signal and processes the signal for transmission to switch 108. The signal is then transmitted to one or more communication networks for transmission to its destination. In one embodiment, radios of radio suite 106 are software defined radios, cognitive radios or the like.

In one embodiment, network 100 is a bidirectional network and as shown includes equipment for forward and reverse links.

In one embodiment, radio suite 106 includes one or more radios and base station controller circuitry and each radio is designed to handle a defined number of channels of total traffic. Conventionally, each radio is assigned to one antenna 103. This is very limiting. In some instances when a particular cell is inundated with traffic the network is over loaded and users have to wait for a reduction in use. The present invention provides a system and method of dynamically allocating radios to antennas. As a result, when the channels for one radio are all occupied one or more additional radios are employed to handle the overflow. These radios are reassigned to the antenna associated with the over loaded radio. For example, this is advantageous in a metropolitan area during rush hour or possibly a popular event e.g. sports, concerts, political gatherings and the like where many individuals are attempting to use their wireless devices at the same time in a defined geographic area. The number of available channels is increased without having to increase capacity for individual cells.

In one embodiment, this is accomplished through a switching device such as 104 of FIG. 1 and a set of radios and signal processing such as radio suite and signal processor 106.

Remote devices 102 consist fundamentally of an antenna, duplexer, multicarrier power amplifier and low-noise amplifier (i.e. the radio "front end".) Other base station circuitry including modulation/demodulation, encoding/decoding, and base station controller interfaces are consolidated in radio suite 106. In the forward link, radio suite 106 generates digital representations of RF signals that are transported to remote devices 102 via switching device 104. The digital representation signals are transported via transport medium 107 to switching device 104 and to remote devices 102 over transport mediums 109-1 to 109-R. Transport mediums 107 and 109 are one or more of, but not limited to, optical fiber, dark fiber, millimeter wave, laser through the air or the like.

Each remote device 102 communicates with subscriber units in a particular coverage area over an RF link provided by remote device's 102 associated antenna 103. The remote device 102 communicates over the RF link using any air interface standard. For example, the air interface standard comprises one of Advanced Mobile Phone System (AMPS), code division multiple access (CDMA), wide-band CDMA (WCDMA), time division multiple access (TDMA), Global System for Mobile communications (GSM), Cellular Digital Packet Data (CDPD), Enhanced Data for GSM Evolution (EDGE), General Packet Radio Service (GPRS), Integrated Digital Enhanced Network (iDEN), Orthogonal Frequency Division Multiplexing (OFDM) or any other appropriate air interface standard. The RF link is made up of a forward link over which the remote device transmits to a subscriber unit. The subscriber unit transmits back to the remote device over a reverse link. The subscriber unit may be a mobile station or a fixed station such as in a wireless local loop system.

Base station system 110 includes transmitters and receivers that enable the subscriber units to communicate with one or more communication networks. The base station system may also link the subscriber unit to other subscriber units that are communicating with other remote devices or base station systems. The remote device is responsible for receiving the RF uplink signal from the subscriber units, digitizing the RF signal and converting the digitized RF signal to a digital optical representation signal for transmission over a transport medium. In the forward link the remote device also converts digital optical representations of digital signals and converts the digital signals to RF signals for transmission to subscriber units.

The radio suite, in the forward link, is responsible for modulating received voice and/or data signals and generating a digital representation of the RF signals for transmission. In the reverse link, the radio suite performs functions associated with a base station transceiver including base station controller operations, demodulation of the voice and data transmissions and etc.

Embodiments of system 100 are scalable, in one embodiment the system includes a single remote device 102-1 and a single radio within suite 106 and the radio handles only a defined number of calls. In this embodiment, the radio supports one or more interface standards. This provides flexibility by offering a lot of services as well as the ability for others to roam in your network. In another embodiment, system 100 includes a single remote device 102-1 and multiple radios within suite 106. The multiple radios are available in order to increase call capacity within remote device 102-1's coverage area. In addition, each radio also supports one or more air interface standards. In an alternate embodiment, system 100 includes multiple remote devices 102-1 to 102-N and a single radio within suite 106. The radio handles only a defined number of calls and is adapted to provide coverage for multiple remote units 102-1 to 102-N. Again, the radio supports one or more air interface standards. In a further embodiment, system 100 includes a plurality of remote devices 102-1 to 102-N and a plurality of radios within suite 106. System 100 is capable of increasing call capacity for each remote unit 102-1 to 102-N by reassigning radios to remote units 102 or assigning more than one radio to one or more remote units 102. Each radio supports one or more air interface standards and system 100 provides maximum flexibility.

Figure 2:
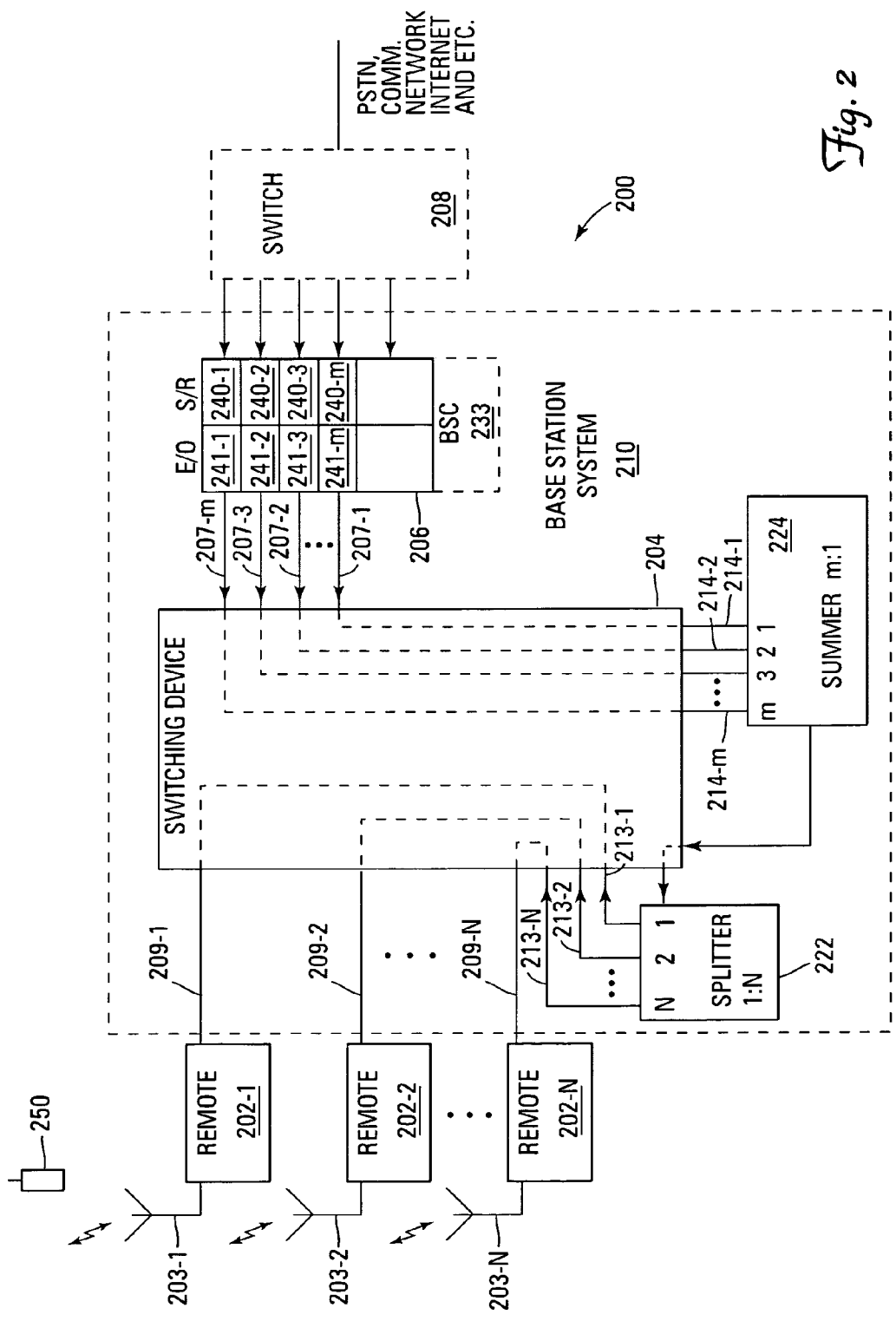
FIG. 2 is a block diagram of one embodiment of a scalable network.

FIG. 2 is a block diagram of one embodiment of a scalable network, shown generally at 200, according to the teachings of the present invention. FIG. 2 illustrates the forward link of scalable radio cellular network 200 from one or more communication networks to one or more subscriber units 250. In one embodiment, scalable network 200 dynamically allocates radios to antennas in a cellular network. As a result channels are dynamically allocated to antennas in the cellular network.

Network 200 includes a base station system 210 coupled to one or more remote devices 202-1 to 202-N. Each remote device 202-1 to 202-N is coupled to an associated antenna 203-1 to 203-N, respectively. In one embodiment, base station system 210 includes a switching device 204 coupled to a radio suite 206. Radio suite 206 includes a plurality of radios 240-1 to 240-M, a plurality of associated electrical-to-optical modules 241-1 to 241-M and a base station controller (BSC) 233. BSC 233 supervises the functioning and control of the multiple radios 240-1 to 240-M. In one embodiment, BSC 233 is a radio network controller. Each radio 240-1 to 240-M supports one or more air interface standards. Radio suite 206 is connected to one or more communication networks via switch 208. In one embodiment, switch 108 is a mobile switching center and handles the switching of calls with multiple base stations, a serving GPRS support node, or the like. In one embodiment, radios 240-1 to 240-M are software defined radios, cognitive radios or the like.

In operation one or more voice and/or data signals destined for subscribers unit 250 are provided to radio suite 206 from one or more communication networks via switch 208. Radio suite 206 receives the voice and/or data signals for transmission to subscribers units 250 via one or more remote devices 202-1 to 202-N. Radios 240-1 to 240-M of radio suite 206 modulate received voice and/or data signals based on air interface standards and convert the voice and/or data signals into a digital representation of the modulated voice/data signals. Each radio 240-1 to 240-M supports a plurality of air interface standards as discussed with respect to FIG. 1 above.

In this embodiment, radio suite 206 further includes a plurality of electrical-to-optical modules (E/O) 241-1 to 241-M. Electrical-to-optical (E/O) modules 241-1 to 241-M take the digital representation of the modulated voice and/or data signals from an output of an associated radio 240-1 to 240-M and convert it into an optical digital representation of the RF signals for transmission over transport medium 207-1 to 207-M to switching device 204 and from switching device 204 to M:1 summer 224 over transport mediums 214-I to 214-M.

Switching device 204 receives the optical digital representation signals from E/O modules 241-1 to 241-M and interconnects radio suite 206 with remote devices 202-1 to 202-N. In one embodiment, switching device 204 is an optical switch or cross-connect and interconnects radio suite 206 with remote devices 202-1 to 202-N using an active optical switch, a passive cross connect, a passive interconnect, a direct connection using fiber optic patch cords (FOPC) or the like.

In one embodiment, base station system 210 further includes a summer 224 that is used to combine the optical digital representation signals of radios 240-1 to 240-M into a single digital optical representation of the RF signals. Summer 224 transmits the single digital optical representation to splitter 222 via switching device 204. Splitter 222 takes the single digital optical representation of the RF signals and makes it available to multiple remote devices 202-1 to 202-N for a simulcast/multicast configuration over transport mediums 209-1 to 209-N and 213-1 to 213-N. In one embodiment, splitter 222 is a passive optical splitter. In one embodiment, remote devices 202-1 to 202-N receive the digital optical representation of the RF signals and convert it to an electrical signal, convert the digital signal to RF and transmit the RF signal through a linear power amplifier (LPA). In one embodiment, switching device 204 includes summer 224 and splitter 222. Transport mediums 207, 209, 214, and 213 are one or more of, but not limited to, optical fiber, dark fiber, millimeter wave, laser through the air or the like.

It is understood that switching device 204 interconnects transport mediums 209-1 to 209-N to any one or more of transport mediums 213-1 to 213-N and transport mediums 214-1 to 214-M to any one of transport mediums 207-1 to 207-M. The dotted lines within switching device 204 are for one configuration only although many configurations are possible. Switching device 204 cross connects any of transport mediums 209-1 to 209-N with any of transport mediums 213-1 to 213-N and cross connects any of transport mediums 214-1 to 214-M with any of transport mediums 207-1 to 207-M.

As a result the need for dedicated radios 240 to antennas 203 is eliminated and the number of channels for an antenna is increased by dynamically reassigning radios 240 to antennas 203. For example if there is a concentration of transmissions in a cell, such as the area served by antenna 203-1, of remote device 202-1, additional radios 240 are dynamically assigned to remote device 202-1.

Figure 2A:
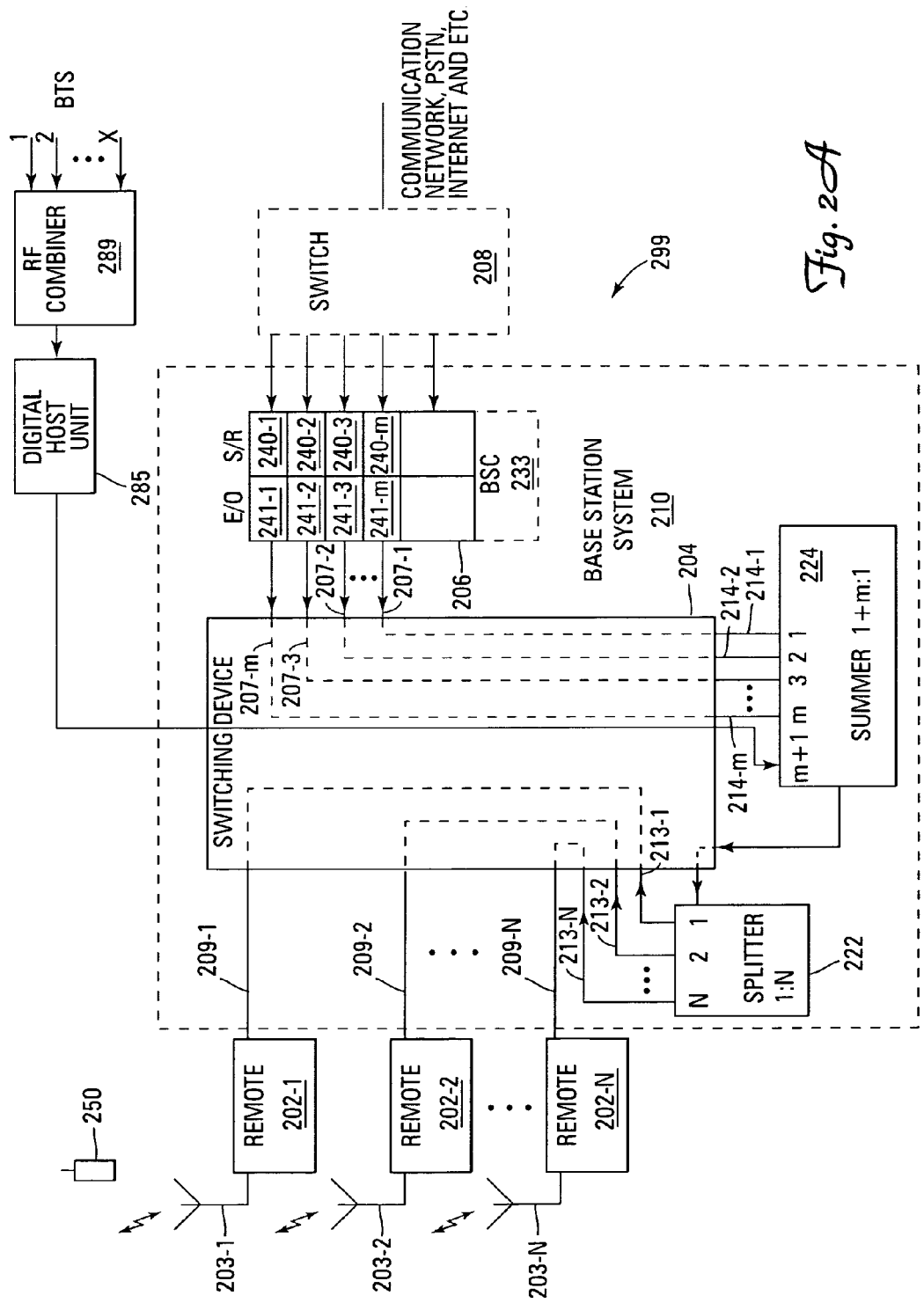
FIG. 2A is a block diagram of another embodiment of a scalable network.

FIG. 2A is a block diagram of another embodiment of a scalable network, shown generally at 299, according to the teachings of the present invention. FIG. 2A illustrates the forward link of scalable radio cellular network 299 from one or more communication networks to one or more subscriber units 250. Network 299 is a modified scalable network 200 of FIG. 2. Network 299 further includes a digital host unit 285 coupled to RF combiner 289. RF combiner 289 receives up to X signals from one or more base station transceivers (BTSs). In this embodiment, summer 224 has been modified to be an M+1 to 1 summer and includes an output of digital host unit 285 in its summation process. In one embodiment, digital host unit 285 is as described in U.S. Pat. No. 6,704,545.

Figure 3:
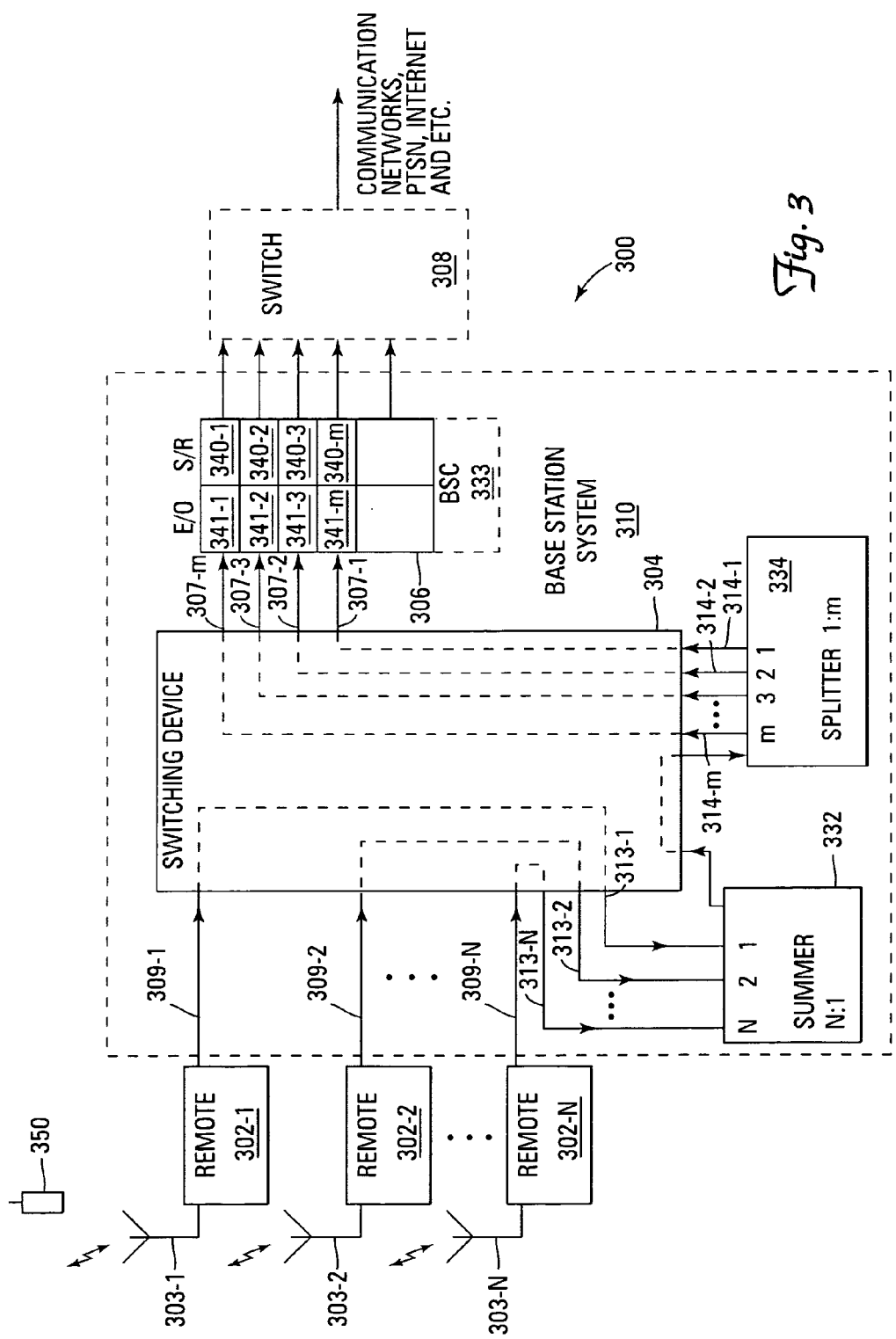
FIG. 3 is a block diagram of one embodiment of a scalable network.

FIG. 3 is a block diagram of one embodiment of a scalable network, shown generally at 300, according to the teachings of the present invention. FIG. 3 illustrates the reverse link of scalable radio cellular network 300 from one or more subscriber units to one or more communication networks. In one embodiment, scalable network 300 dynamically allocates radios to antennas in a cellular network.

Network 300 includes a base station system 310 coupled to one or more remote devices 302-1 to 302-N. Each remote device 302-1 to 302-N is coupled to an associated antenna 303-1 to 303-N, respectively. In one embodiment, base station system 310 includes a switching device 304 coupled to a radio suite 306. Radio suite 306 includes a plurality of radios 340-1 to 340-M, a plurality of associated electrical-to-optical modules 341-1 to 341-M and a base station controller (BSC) 333. Each radio 340-1 to 340-M supports multiple one or more air interface standards. In one embodiment, radio suite 306 is further coupled to switch 308. In one embodiment, switch 308 is a mobile switching center that handles the switching of calls with multiple base stations, a serving GPRS support node, or the like.

In one embodiment, radios 340-1 to 340-M are software defined radios, cognitive radios or the like.

In operation, when a subscriber unit such as subscriber unit 350 emits a transmission RF signal a nearby antenna such as antennas 303-1 to 303-N picks up the signal. An associated remote device 302-1 to 302-N digitizes, converts from electrical to optical and transmits a digital optical representation of the RF signal to base station system 310 for routing to one or more communication networks. This is described in more detail below.

In one embodiment, switching device 304 receives the digital optical representation of the RF signal and cross connects the signal to one or more radios 340-1 to 340-R of radio suite 306. In one embodiment, radio suite 306 receives the signal and processes the signal for transmission to one or more communication networks via switch 308. The signal is then transmitted to the communication network for connection to its destination.

In this embodiment, remote devices 302-1 to 302-N receive RF uplink signals from subscriber units such as subscriber unit 350 and digitize the RF signal, and convert the electrical signal to optical for transmission to base station system 310. The optical signal is transmitted to base station system 310 over transport mediums 309-1 to 309-N. Base station 310 includes a summer 332 coupled to each of remote devices 302-1 to 302-N. In one embodiment, summer 332 is a digital summation module and combines the optical signals from multiple remote devices 302-1 to 302-N into a single digital optical representation of an RF signal. The single digital optical representation is passed through switching device 304 for connection to splitter 334 via transport mediums 313-1 to 313-M. In one embodiment, splitter 334 is a passive optical splitter and takes the output of summer 332 and makes it available to multiple radios 340-1 to 340-M. Radio suite 306 includes a plurality of electrical to optical modules (E/O) 341-1 to 341-M and a plurality of associated radios 340-1 to 340-M. In one embodiment, each E/O module 341-1 to 341-M receives the optical signals from splitter 334 over transport mediums 314-1 to 314-M and 307-1 to 307-M, converts the signals to electrical signals, decimates the digital representation of an RF signal and provides just the channels needed for the associated radios 340-1 to 340-M. Radios 340-1 to 340-M each performs functions associated with a base station transceiver including demodulating voice and data transmissions. BSC 333 supervises the functioning and control of the multiple radios 340-1 to 340-M.

Transport mediums 307, 309, 313 and 314 are one or more of, but not limited to, optical fiber, dark fiber, millimeter wave, laser through the air or the like Switching device 304 interconnects remote devices 302-1 to 302-N with radio suite 306. In one embodiment, switching device 304 is an optical switch or cross-connect and interconnects remote devices 302-1 to 302-N with radio suite 306 using an active optical switch, a passive cross connect, a passive interconnect, a direct connection using fiber optic patch cords (FOPC) or the like.

It is understood that switching device 304 interconnects transport mediums 309-1 to 309-N to any one or more of transport mediums 313-1 to 313-N and transport mediums 314-1 to 314-M to any one of transport mediums 307-1 to 307-M. The dotted lines within switching device 304 are for one configuration only although many configurations are possible. Switching device 304 cross connects any of transport mediums 309-1 to 309-N with any of transport mediums 313-1 to 313-N and cross connects any of transport mediums 314-1 to 314-M with any of transport mediums 307-1 to 307-M.

In one embodiment, FIG. 2 illustrates the reverse link of a scalable network and FIG. 3 illustrates the forward link of the same scalable network. In one embodiment, switching devices 204 and 304 combine to create a single switching device.

Figure 3A:
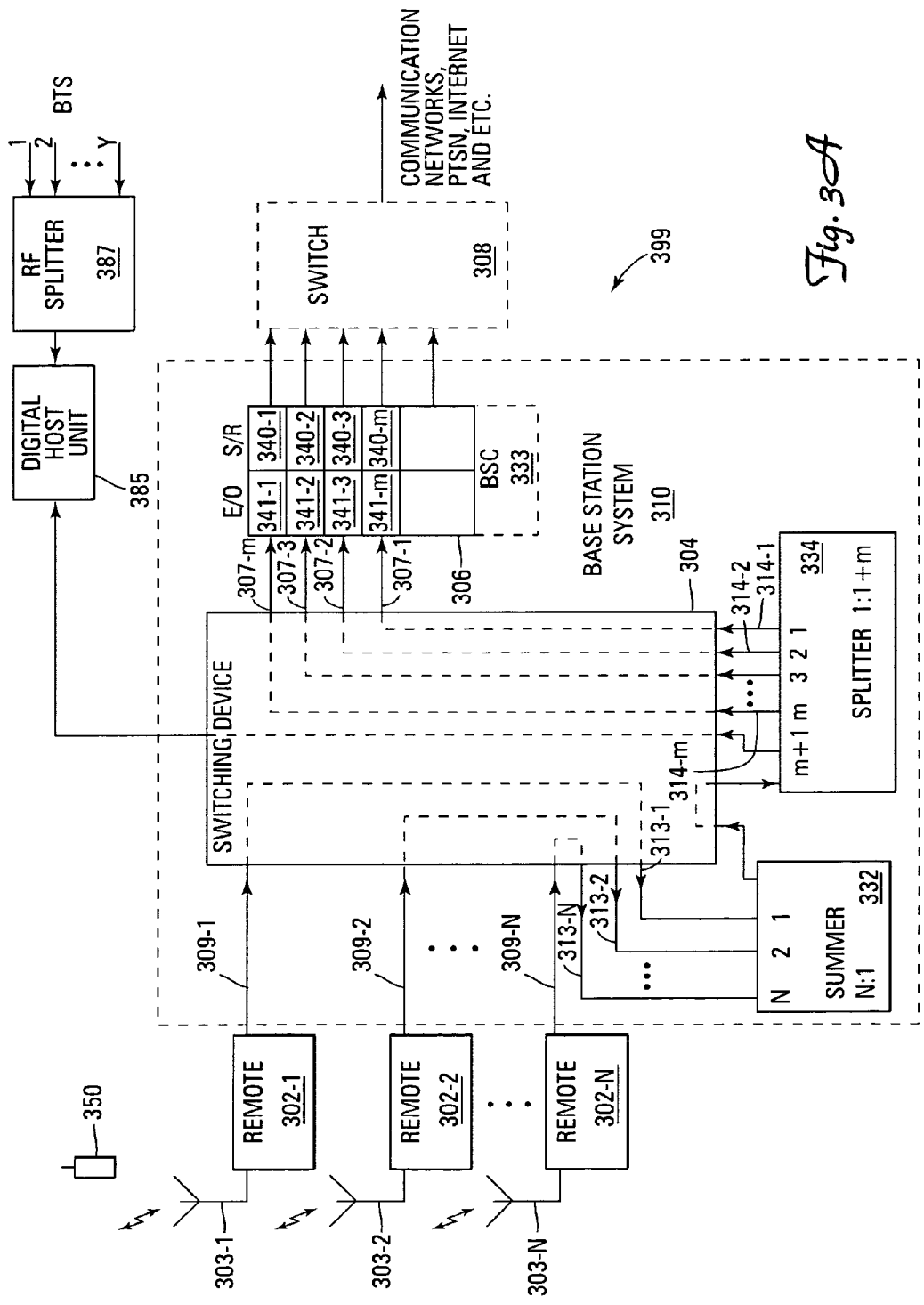
FIG. 3A is a block diagram of another embodiment of a scalable network.

FIG. 3A is a block diagram of another embodiment of a scalable network, shown generally at 399, according to the teachings of the present invention. FIG. 3A illustrates the reverse link of scalable radio cellular network 399 from one or more subscriber units 350 to one or more communication networks. Network 399 is a modified scalable network 300 of FIG. 3. Network 399 further includes a digital host unit 385 coupled to RF splitter 387. RF splitter 387 divides signals received from digital host unit 385 into Y signals and transmits the signals to one or more base station transceivers (BTSs). In this embodiment, splitter 334 has been modified to be an 1 to M+1 splitter and includes an output M+1 to digital host unit 385. In one embodiment, digital host unit 385 is as described in U.S. Pat. No. 6,704,545.

Figure 4:
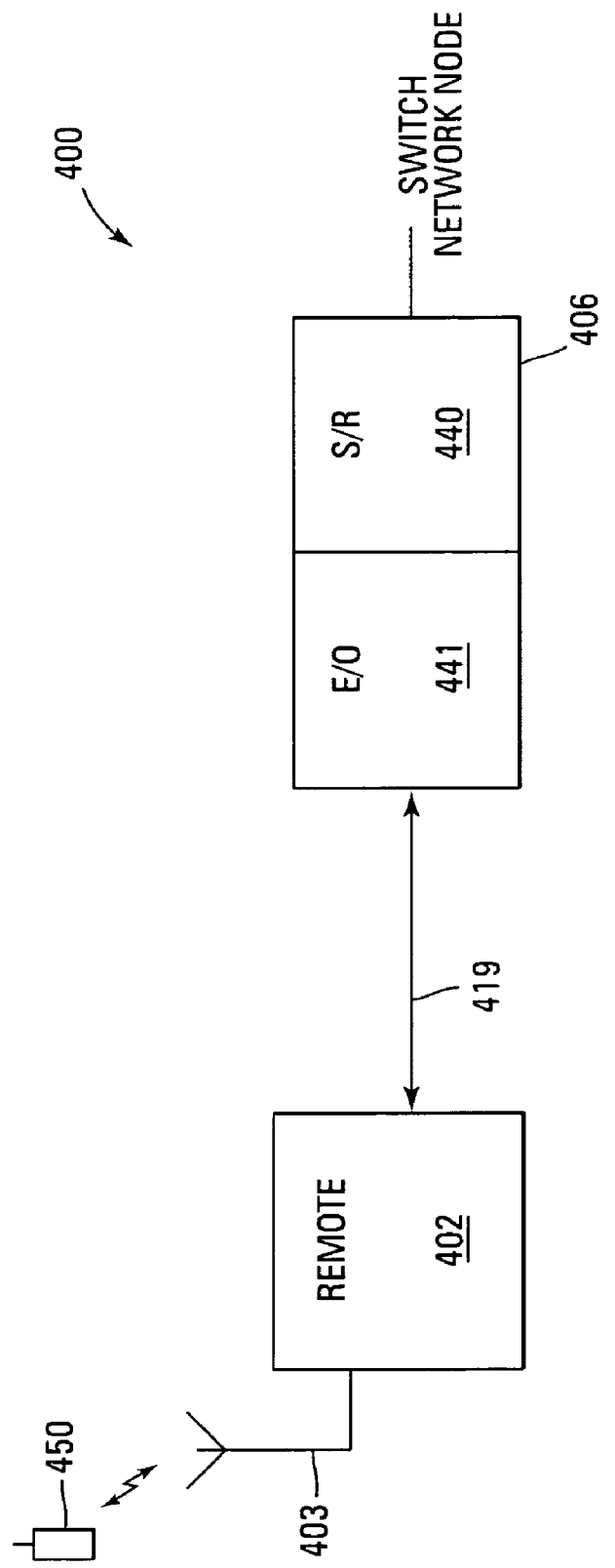
FIG. 4 is a block diagram of one embodiment of a scalable network.

FIG. 4 is a block diagram of one embodiment of a radio network, shown generally at 400, according to the teachings of the present invention. Network 400 includes a remote device 402 coupled to an antenna 403. Remote device 402 is also coupled to radio suite 406 having a single radio 440 and an electrical/optical module 441. In one embodiment, remote device 402 is collocated with radio suite 406. In another embodiment, remote device 402 is located at a separate location from radio suite 406.

Network 400 is bidirectional. In operation, when subscriber unit 450 emits a transmission signal in the coverage area, remote device 402 receives RF uplink signals from subscriber unit 450, digitizes the RF signal, and converts the signal from electrical to optical and transmits a digital optical representation of the RF signal to radio suite 406 over transport medium 419. Transport medium 419 is one or more of optical fiber, dark fiber, millimeter wave, laser through the air or the like.

E/O module 441 receives the digital optical representation and converts the signal from optical to electrical, decimates the digital representation of the RF signal and provides just the channels needed for the associated radio 440. Radio 440 performs functions associated with a base station transceiver including de-modulating the voice and data transmissions. Radio 440 is very flexible and supports one or multiple air interface standards.

In one embodiment, radios 440 is a software defined radios, cognitive radio or the like.

In the forward link, radio 440 operates as a base station transceiver and modulates the voice or data signals received from a communication network via a switch, network node, or the like. Radio 440 generates a digital representation of the modulated voice/data signals to be transmitted. E/O module 441 takes the digital representation of the signals from the output of radio 440, and converts it to optical for transmission over transport medium 419 to remote device 402. Remote device 402 converts the digital optical representation of the signals to electrical, converts the digital signal to RF and transmits the signal through a linear power amplifier (LPA) to designated subscribers such as subscriber unit 450.

Figure 5:
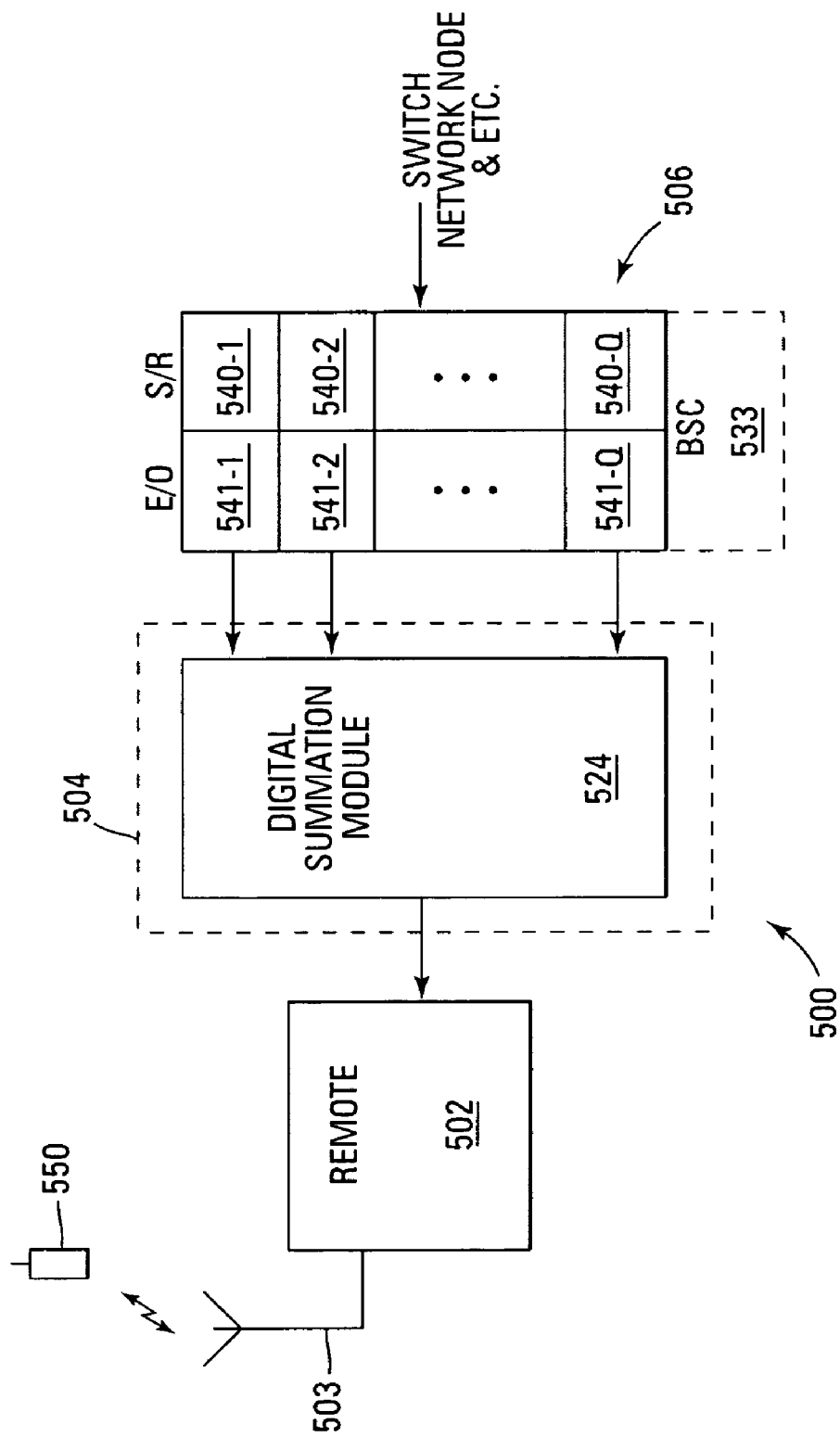
FIG. 5 is a block diagram of one embodiment of a scalable network.

FIG. 5 is a block diagram of one embodiment of a scalable network, shown generally at 500, according to the teachings of the present invention. FIG. 5 illustrates the forward link of scalable radio cellular network 500 from one or more communication networks to subscriber unit 550. In one embodiment, scalable network 500 dynamically allocates radios to antennas in a cellular network.

In this embodiment, network 500 includes a remote device 502 coupled to antenna 503. Network 500 includes a digital summation module 524 coupled to remote device 502. Network 500 further includes a radio suite 506 that includes a plurality of radios 540-1 to 540-Q having a plurality of associated electrical/optical modules 541-1 to 541-Q, and a base station controller (BSC) 533. BSC 533 supervises the functioning and control of the multiple radios 540-1 to 540-Q. Radios 540-1 to 540-Q each support one or multiple air interface standards.

In operation, in one embodiment, radios 540-1 to 540-Q each operates as a base station transceiver and generates a digital representation of voice and/or data signals received from a communication network via a switch or network node. The generation includes modulation of the voice or data to be transmitted. Each E/O module 541-1 to 541-Q takes the digital representation of the RF signals and converts the electrical signals to optical signals. The digital optical representation of the RF signals are fed to digital summation module 524 and combined into a single digital optical representation of the RF signals. Summer 524 transmits the single digital optical representation to remote device 502 for transmission to one or more subscriber units such as subscriber unit 550.

In one embodiment, radios 540-1 to 540-Q are software defined radios, cognitive radios or the like.

In one embodiment, remote device 502 receives the digital optical representation of the RF signals, converts it to an electrical signal, converts the digital signal to RF and transmits the signals to subscriber unit 550 through a linear power amplifier (LPA).

Figure 6:
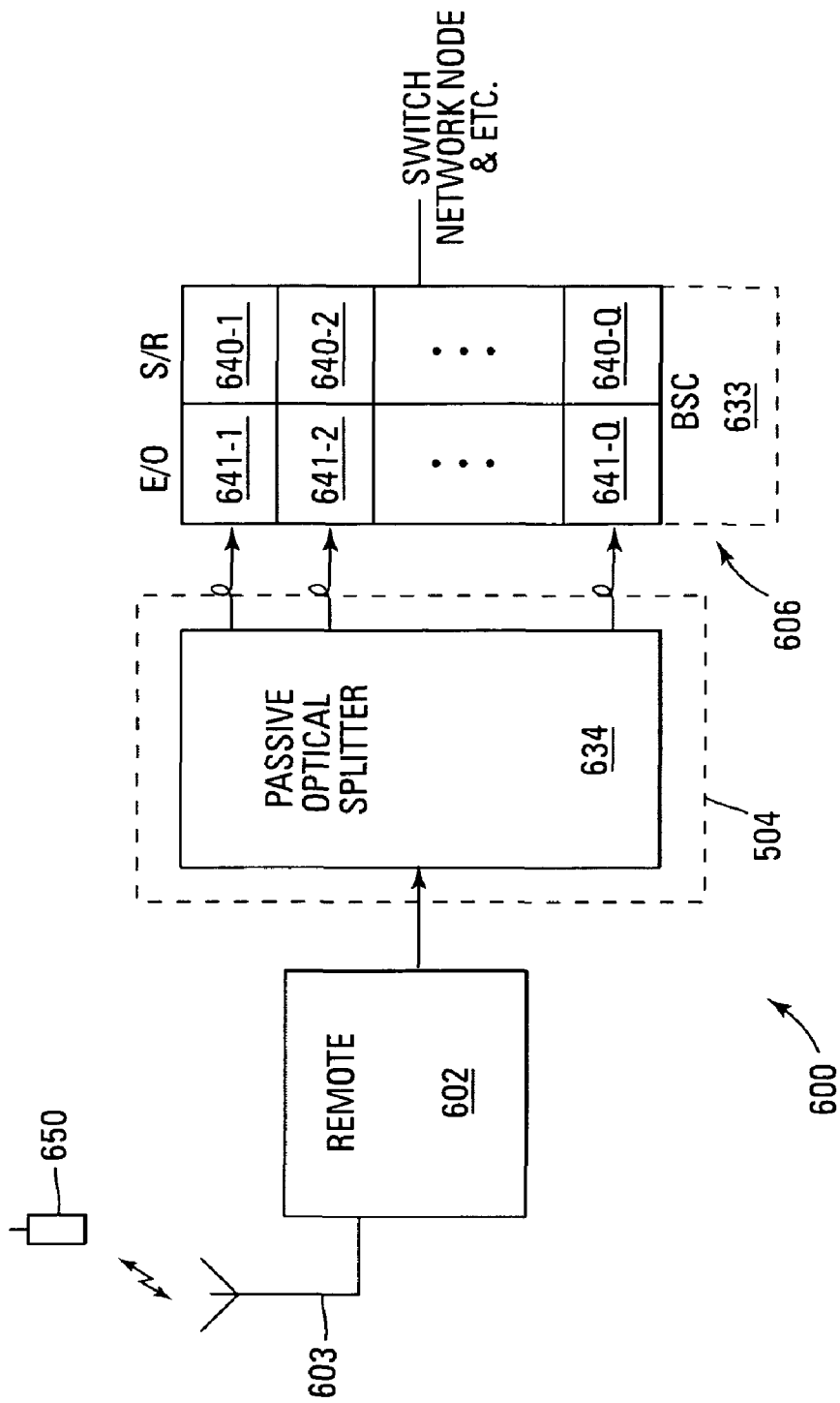
FIG. 6 is a block diagram of one embodiment of a scalable network.

FIG. 6 is a block diagram of one embodiment of a scalable network, shown generally at 600, according to the teachings of the present invention. FIG. 6 illustrates the reverse link of scalable radio cellular network 600 from one or more subscriber units such as subscriber 650 to one or more communication networks. In one embodiment, scalable network 600 dynamically allocates radios to antennas in a cellular network.

In this embodiment, network 600 includes a remote device 602 coupled to antenna 603, a passive optical splitter 634 coupled to remote device 602 and radio suite 606.

In operation, multiple radios 640-1 to 640-Q feed single remote device 602. When a mobile device makes a call or emits a transmission signal within the coverage area, nearby antenna 603 picks up the signal. Associated remote device 602 transmits the signal to passive optical splitter 634 for transmission to one or more communication networks via a plurality of radios 640-1 to 640-Q. In this embodiment, radio suite 606 includes a plurality of electrical to optical modules (E/O) 641-1 to 641-Q, a plurality of associated radios 640-1 to 640-Q and base station controller (BSC) 633. BSC 633 supervises the functioning and control of the multiple radios 640-1 to 640-Q.

In one embodiment, radios 640-1 to 640-Q are software defined radios, cognitive radios or the like.

In this embodiment, remote device 602 receives RF uplink signals from subscriber unit 650 and digitizes the RF signal, converts the electrical signal to optical for transmission to radio suite 606 over a transport medium. Network 600 includes a splitter 634 coupled to remote device 602. In one embodiment, splitter 634 is a passive optical splitter and takes the output of remote device 602 and makes it available to multiple radios 640-1 to 640-Q.

In one embodiment, each E/O module 641-1 to 641-Q converts the optical signal from remote 602 into electric signals and decimates the digital representation of the RF signal and provides just the channels needed for the associated radios 640-1 to 640-Q. In one embodiment, radios 640-1 to 640-Q each perform the functions associated with a base station transceiver including demodulating voice and data transmissions. Each radio 640-1 to 640-Q supports one or multiple air interface standards.

In one embodiment, FIG. 5 illustrates the forward link of a scalable network and FIG. 6 illustrates the reverse link of the same scalable network. In one embodiment, digital summation module 524 and passive optical splitter 634 combine to create a single switching device 504.

Figure 7:
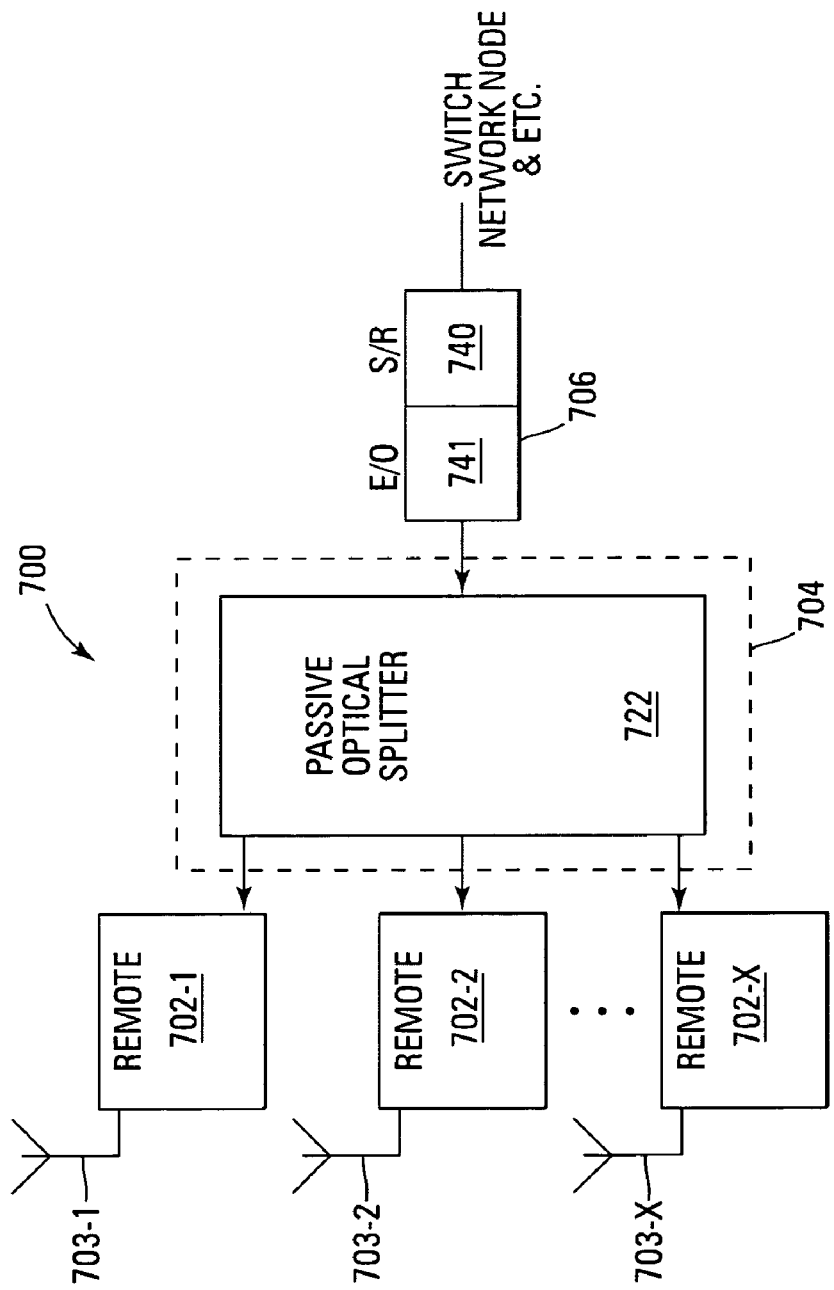
FIG. 7 is a block diagram of one embodiment of a scalable network.

FIG. 7 is a block diagram of one embodiment of a scalable network, shown generally at 700, according to the teachings of the present invention. FIG. 7 illustrates the forward link of scalable radio cellular network 700 from one or more communication networks to one or more subscriber units such as subscriber unit 750.

In this embodiment, network 700 includes a plurality of remote devices 702-1 to 702-X. Each remote device 702-1 to 702-X is coupled to an associated antenna 703-1 to 703-X. In one embodiment, network 700 includes a passive optical splitter 722 coupled to remote devices 702-1 to 702-X. Network 700 further includes a radio suite 706 that includes a single radio 740 and electrical/optical module 741.

In operation, radio 740 operates as a base station transceiver and modulates the voice and or data signals received from a communication network via a switch, network node, or the like. Radio 740 supports one or more air interface standards. Radio 740 generates a digital representation of the modulated voice/data signals to be transmitted. E/O module 741 takes the digital representation of the signals from the output of radio 740, and converts it to optical for transmission over a transport medium to splitter 722. Splitter 722 takes the output signal and makes it available to multiple remote devices 702-1 to 702-X for a simulcast/multicast configuration.

In one embodiment, radio 740 is a software defined radio, cognitive radio or the like.

Remote devices 702-1 to 702-X receive the digital optical representation of the RF signals, convert it to an electrical signal, convert the electrical signal to RF and transmit the signal through a linear power amplifier (LPA) to designated subscribers such as subscriber unit 750.

Figure 8:
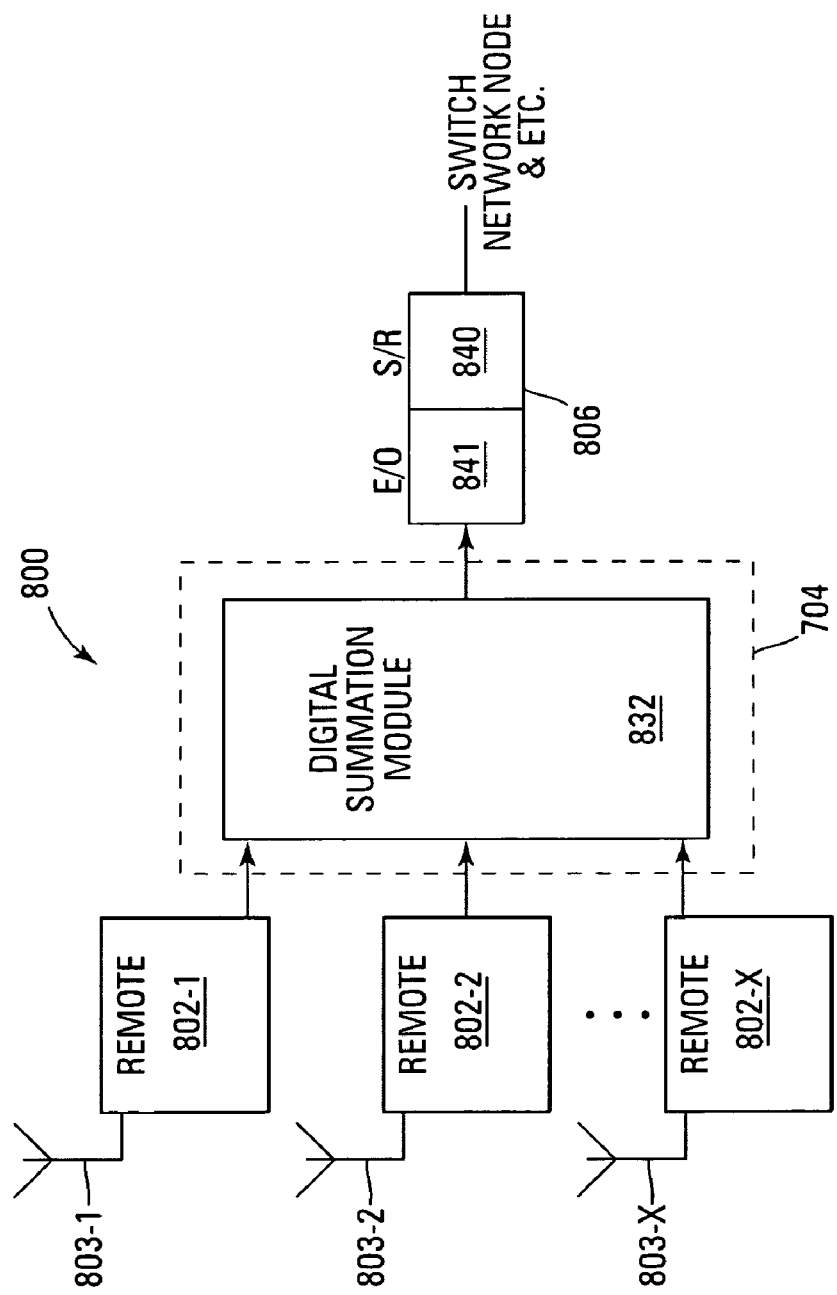
FIG. 8 is a block diagram of one embodiment of a scalable network.

FIG. 8 is a block diagram of one embodiment of a scalable network, shown generally at 800, according to the teachings of the present invention. FIG. 8 illustrates the reverse link of scalable radio cellular network 800 from one or more subscriber units to one or more communication networks. In one embodiment, scalable network 800 dynamically allocates radios to antennas in a cellular network.

In this embodiment, network 800 includes a plurality of remote devices 802-1 to 802-X. Each remote device 802-1 to 802-X is coupled to an associated antenna 803-1 to 803-X. Network 800 includes a summation module 832 coupled to remote devices 802-1 to 802-X. In one embodiment, summation module 832 is a digital summation module. Network 800 further includes a radio suite 806 that includes a single radio 840 and electrical/optical module 841. In one embodiment, radio 840 is a software defined radio, cognitive radio or the like.

In this embodiment, remote devices 802-1 to 802-X receive RF uplink signals from subscriber units and digitize the RF signal, convert the electrical signal to optical for transmission to summation module 832. Summer 832 is coupled to each of remote devices 802-1 to 802-X. In one embodiment, summer 832 is a digital summation module and combines the optical signals from multiple remote devices 802-1 to 802-X into a single digital optical representation of an RF signal. The single digital optical representation is transmitted to radio suite 806.

Radio suite 806 includes an electrical to optical modules (E/O) 841 and a single radio 840. In one embodiment, E/O module 841-1 converts the optical signal from digital summation module 832 and converts the signal to an electrical signal and decimates the digital representation of an RF signal and provides just the channels of the associated radio 840. Radio 840 performs the functions associated with a base station transceiver including demodulating voice and data transmissions.

In one embodiment, FIG. 7 illustrates the forward link of a scalable network and FIG. 8 illustrates the reverse link of the same scalable network. In one embodiment, digital summation module 832 and passive optical splitter 722 combine to create a single switching device 704.

The radios used in the above described networks enable defined base stations to maximize flexibility by synthesizing and demodulating all signals in software or reprogrammable hardware. Channel assignments, service options, and even air interface technologies are modified in software, without requiring hardware changes.

A number of embodiments of the invention defined by the following claims have been described. Nevertheless, it will be understood that various modifications to the described embodiments may be made without departing from the scope of the claimed invention. Accordingly, other embodiments are within the scope of the following claims.

What is claimed is:

1. A cellular network, comprising:
a plurality of remote devices each remote device coupled to an antenna and adapted to communicate with subscriber units over an RF link;
a radio suite coupled to the remote devices;
wherein the radio suite includes a plurality of radios that perform the functions of a base station transceiver;
wherein the radio suite generates a digital representations of RF signals received from a communication network for transmission over a transport medium to the plurality of remote devices;
wherein each radio of the plurality of radios supports one or more air interface standards; and
a switching device coupled to at least one remote device of the plurality of remote devices and the radio suite, wherein the switching device connects the at least one remote device simultaneously to more than one radio of the plurality of radios;
wherein at least two of the digital representations of RF signals are combined into a single combined digital representation of the RF signals and the single combined digital representation is sent to at least two remote devices of the plurality of remote devices.

2. The network of claim 1, wherein the remote device digitizes and converts RF signals received over the RF link to a digital optical representation of the RF signals for transport to the radio suite.

3. The network of claim 1, wherein the radio suite includes an electrical-to-optical module that decimates and converts the digital optical representation to electrical signals.

4. The network of claim 1, wherein the at least one remote device converts a digital optical representation of voice/data signals received from the radio suite to RF signals for transmission to subscribers over the RF link.

5. The network of claim 1, wherein the radio suite converts the digital representation of the RF signals to a digital optical representation of the RF signals for transmission over a transport medium to the remote device.

6. The network of claim 1, wherein the one or more air interface standards include Global System for Mobile communications standard, Advanced Mobile Phone System, code division multiple access, wide-band CDMA, time division multiple access, Cellular Digital Packet Data (CDPD), Enhanced Data for GSM Evolution (EDGE), General Packet Radio Service (GPRS), and Integrated Digital Enhanced Network (iDEN).

7. The network of claim 5, wherein the transport medium is fiber optic.

8. The network of claim 5, wherein the transport medium is millimeter wave.

9. The network of claim 5, wherein the transport medium is dark fiber.

10. The network of claim 5, wherein the transport medium is Free Space Optics (FSO).

11. The network of claim 1, wherein each radio of the plurality of radios is one of a software defined radio and a cognitive radio.

12. The network of claim 1, further comprising:
a summer, wherein the summer combines the at least two digital representations of RF signals; and
a splitter, wherein the splitter splits the combined digital representation for sending to the at least two remote devices.

13. The network of claim 12, wherein the summer, the splitter, and the switching device are functions performed by a single device.

14. The network of claim 12, wherein the switching device couples the at least two digital representations of RF signals from the radio suite to the summer and couples at least one other digital representation of RF signals from the radio suite to the at least one remote device.

15. A scalable network, comprising:
a plurality of remote devices, wherein each remote device is coupled to an associated antenna and adapted to communicate with subscriber units over an RF link;
a switching device coupled to the plurality of remote devices; and
a radio suite coupled to the switching device;
wherein the radio suite includes a plurality of radios that perform the functions of a base station transceiver;
wherein the radio suite generates a digital representation of RF signals received from a communication network for transmission over a transport medium to the switching device;
wherein the switching device interconnects a first radio simultaneously with more than one remote device of the plurality of remote devices;
wherein the switching device combines a digital representation of RF signals from the first radio with a digital representation of RF signals from a second radio of the plurality of radios to form a single combined digital representation of RF signals and the single combined digital representation is sent to a first remote device and a second remote device of the plurality of remote devices;
wherein the first radio supports one or more air interface standards.

16. The network of claim 15, wherein each of the plurality of remote devices converts RF signals received over the RF link to a digital optical representation of the RF signals for transmission to the switching device.

17. The network of claim 16, wherein the radio suite includes an electrical-to-optical module and converts the digital optical representation of the RF signals to electrical signals.

18. The network of claim 15, wherein each of the plurality of remote device converts a digital optical representation of RF signals received from the switching device to RF signals for transmission to subscribers over the RF link.

19. The network of claim 15, wherein the radio suite converts the digital representation of RF signals to a digital optical representation of the RF signals for transmission over a transport medium to the switching device.

20. The network of claim 19, wherein the switching device includes a passive optical splitter that cross connects the combined digital optical representation of the RF signals and provides it to the first remote devices and the second remote device.

21. The network of claim 19, wherein the communication network is the public switched telephone network.

22. The network of claim 19, wherein the communication network is the Internet.

23. The network of claim 19, wherein the communication network is a cable network.

24. The network of claim 15, wherein the switching device includes a digital summation module coupled to each of the plurality of remote devices and combines optical signals from the plurality of remote devices into a single digital optical representation of an RF signal.

25. The network of claim 15, wherein the switching device sends a digital representation of RF signals from a third radio of the plurality of radios to a third remote device of the plurality of remote devices.

26. The network of claim 25, wherein the radio operates on a first set of radio channels associated with the third remote device.

27. The network of claim 26, wherein the radio is adapted to dynamically reassign the first set of radio channels to one or more of the other remote devices of the plurality of remote devices.

28. A method of communicating in a cellular network, the method comprising:
- a remote device receiving one or more radio frequency (RF) signals over an air interface;
- converting the one or more radio frequency signals to a digital optical representation of the RF signals;
- transmitting the digital optical representation of the RF signals over an optical medium;
- combining the digital optical representation of the RF signals from the remote device with a digital optical representation of an RF signal from a second remote device to form a single combined digital optical representation;
- dividing the single combined digital optical representation into a plurality of digital optical signals;
- converting each of the divided digital optical signals into digital RF signals at one of a plurality of electrical-to-optical modules;
- decimating the digital RF signals;
- at each electrical-to-optical module, passing only channels assigned to an associated software radio of a plurality of software radios;
- connecting the remote device simultaneously to more than one software radio of the plurality of software radios;
- wherein each software radio supports one or more air interface standards;
- performing signal processing; and
- transmitting the processed signals to one or more communication networks.

29. The method of claim 28, wherein converting the one or more radio frequency signals to a digital optical signal comprises digitizing the one or more radio frequency signals.

30. The method of claim 28 further comprising:
- coupling a digital optical representation from a third remote device directly to a electrical-to-optical module.

* * * * *

UNITED STATES PATENT AND TRADEMARK OFFICE
CERTIFICATE OF CORRECTION

PATENT NO. : 7,787,854 B2
APPLICATION NO. : 11/047808
DATED : August 31, 2010
INVENTOR(S) : Conyers et al.

It is certified that error appears in the above-identified patent and that said Letters Patent is hereby corrected as shown below:

Claim 1, Column 11, Line 36, insert --plurality of-- between 'coupled to the' and 'remote devices'

Claim 1, Column 11, Line 39, please delete "a" between 'generates' and 'digital'

Claim 2, Column 11, Line 55, insert --at least one-- after 'wherein the'

Claim 5, Column 12, Line 2, insert --at least one-- after 'medium to the'

Claim 26, Column 13, Line 33, insert --third-- after 'wherein the'

Claim 27, Column 13, Line 36, insert --third-- after 'wherein the'

Signed and Sealed this
Twenty-eighth Day of December, 2010

David J. Kappos
*Director of the United States Patent and Trademark Office*